United States Patent
Mori et al.

(10) Patent No.: US 8,402,851 B2
(45) Date of Patent: Mar. 26, 2013

(54) FRICTION-ROLLER TYPE TRANSMISSION MECHANISM

(75) Inventors: Atsuhiro Mori, Fujisawa (JP); Takeshi Kariya, Yokohama (JP); Shinji Kiyohara, Ebina (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 421 days.

(21) Appl. No.: 12/864,188

(22) PCT Filed: Jan. 20, 2009

(86) PCT No.: PCT/JP2009/050748
§ 371 (c)(1),
(2), (4) Date: Jul. 22, 2010

(87) PCT Pub. No.: WO2009/093569
PCT Pub. Date: Jul. 30, 2009

(65) Prior Publication Data
US 2010/0292045 A1 Nov. 18, 2010

(30) Foreign Application Priority Data
Jan. 24, 2008 (JP) ................... 2008-013224

(51) Int. Cl.
*F16H 21/14* (2006.01)
(52) U.S. Cl. ............. 74/67; 384/584; 384/585; 384/537
(58) Field of Classification Search ...... 74/67; 384/584, 384/585, 537
See application file for complete search history.

(56) References Cited

U.S. PATENT DOCUMENTS

| | | | | |
|---|---|---|---|---|
| 3,378,093 | A | | 4/1968 | Hill |
| 4,014,224 | A | * | 3/1977 | Pitts ............................. 475/176 |
| 4,483,055 | A | * | 11/1984 | Sekimoto et al. .......... 29/893.32 |
| 4,559,846 | A | | 12/1985 | Cochran et al. |
| 4,656,891 | A | * | 4/1987 | Durand ......................... 475/179 |
| 4,782,721 | A | | 11/1988 | Dick |
| 4,901,598 | A | | 2/1990 | Batchelor et al. |

(Continued)

FOREIGN PATENT DOCUMENTS

| | | |
|---|---|---|
| EP | 1 808 617 A1 | 7/2007 |
| JP | 2-33956 U | 3/1990 |

(Continued)

OTHER PUBLICATIONS

U.S. Appl. No. 12/810,255, filed Jun. 23, 2010, Mori.

(Continued)

*Primary Examiner* — David M Fenstermacher
(74) *Attorney, Agent, or Firm* — Foley & Lardner LLP (57) ABSTRACT

Under control of rotation of a crankshaft 41, a friction roller 32 is pressed against a friction roller 31 in a radial direction, so as to achieve torque transmission between the rollers 31, 32. An inter-roller radial pressing reaction is canceled as an internal force in bearing supports 23, 25, with no input to a housing 11. The reaction causes a radial displacement of a bearing-fitting portion provided with inner and outer bearings 21, 42 in double layer arrangement, wherein the radial displacement is larger than that of a bearing-fitting portion provided with a bearing 18, 19, 22 in single arrangement, so as to cause unbalanced contact between rollers 31, 32. In order to prevent this, support stiffness of bearing support 23 against the inter-friction-roller radial pressing reaction is set higher than that of bearing support 25.

8 Claims, 6 Drawing Sheets

U.S. PATENT DOCUMENTS

| | | | | |
|---|---|---|---|---|
| 4,907,472 A | * | 3/1990 | Mura | 475/89 |
| 5,054,335 A | | 10/1991 | Andrews | |
| 5,518,464 A | | 5/1996 | Teraoka | |
| 6,199,653 B1 | * | 3/2001 | Matsufuji et al. | 180/233 |
| 6,238,317 B1 | | 5/2001 | Brown et al. | |
| 6,438,480 B2 | | 8/2002 | Tanaka et al. | |
| 6,440,030 B1 | * | 8/2002 | Minegishi et al. | 475/178 |
| 6,551,211 B2 | | 4/2003 | Kanazawa | |
| 6,719,658 B2 | | 4/2004 | Haga et al. | |
| 6,849,025 B2 | | 2/2005 | Chikaraishi et al. | |
| 6,955,623 B2 | * | 10/2005 | Pattok | 475/3 |
| 7,387,588 B2 | * | 6/2008 | Bader | 475/303 |
| 7,575,535 B2 | * | 8/2009 | Yamamoto | 476/42 |
| 7,628,722 B2 | * | 12/2009 | Yoshimura | 475/249 |
| 8,316,738 B2 | | 11/2012 | Hellinger | |
| 2002/0124686 A1 | | 9/2002 | Ohtani et al. | |
| 2002/0147068 A1 | | 10/2002 | Chikaraishi et al. | |
| 2004/0198549 A1 | | 10/2004 | Wafzig | |
| 2005/0143211 A1 | | 6/2005 | Yamamoto | |
| 2005/0266954 A1 | | 12/2005 | Yoshimura | |
| 2008/0064553 A1 | | 3/2008 | Newton | |

FOREIGN PATENT DOCUMENTS

| | | |
|---|---|---|
| JP | 2001-341539 A | 12/2001 |
| JP | 2002-87091 A | 3/2002 |
| JP | 2002-87092 A | 3/2002 |
| JP | 2002-349653 A | 12/2002 |
| JP | 2003-028251 A | 1/2003 |
| JP | 2003-247617 A | 9/2003 |
| JP | 2004-306948 A | 11/2004 |
| JP | 2005-188701 A | 7/2005 |
| JP | 2005-337442 A | 12/2005 |
| JP | 2006-132738 A | 5/2006 |

OTHER PUBLICATIONS

U.S. Appl. No. 12/864,194, filed Jul. 22, 2010, Mori.

A. Mori et al., US PTO Notice of Allowance, U.S. Appl. No. 12/864,194, dated Feb. 2, 2012, (13 pgs.).

M. Suzuki et al., Non-Final Office Action, U.S. Appl. No. 12/680,400, dated Nov. 26, 2012, (18 pgs.).

* cited by examiner

▨ AMOUNT OF CONTRACTION OF SINGLE BEARING
◩ AMOUNT OF CONTRACTION OF DOUBLE BEARING
▧ AMOUNT OF EXPANSION OF BEARING SUPPORT

BEARING SUPPORT WITH DOUBLE BEARING​ ​ ​ BEARING SUPPORT WITHOUT DOUBLE BEARING

FIG.7

▨ AMOUNT OF CONTRACTION OF SINGLE BEARING
◩ AMOUNT OF CONTRACTION OF DOUBLE BEARING
▧ AMOUNT OF EXPANSION OF BEARING SUPPORT

BEARING SUPPORT WITH DOUBLE BEARING​ ​ ​ BEARING SUPPORT WITHOUT DOUBLE BEARING

FRICTION-ROLLER TYPE TRANSMISSION MECHANISM

TECHNICAL FIELD

The present invention relates to a friction roller type transmission mechanism wherein a pair of friction rollers that rotate about respective axes parallel to one another are pressed against one another in a radial direction of the friction rollers into frictional contact with one another in one of a direct manner and an indirect manner, to allow power transmission between the friction rollers.

BACKGROUND OF THE INVENTION

Conventionally, as disclosed in a patent document 1, a friction roller type transmission mechanism is known in which in order to prevent a radial pressing reaction from being directly inputted to a housing when the friction rollers are in frictional contact with one another, shafts of the friction rollers are bearing-fitted to common bearing supports on both sides of the friction rollers in an axial direction, wherein the bearing supports are attached to the housing, so that the friction rollers are rotatably supported with respect to the housing.

In such a friction roller type transmission mechanism, the radial pressing reaction, which is caused when the friction rollers are in frictional contact with one another, is canceled as an internal force within the bearing supports, and prevented from being inputted directly to the housing, thereby making it possible to reduce the weight of the housing because the strength of the housing does not need to be high.

Patent Document 1: JP 2002-349653 A

SUMMARY OF THE INVENTION

Patent document 1 is silent about support stiffness of the bearing supports on both sides of the friction rollers in the axial direction against the inter-friction-roller radial pressing reaction, wherein the bearing supports have the same specifications. Accordingly, it should be naturally assumed that the bearing supports are identical to one another in the support stiffness against the inter-friction-roller radial pressing reaction.

However, in such a case where the bearing supports on both sides of the friction rollers in the axial direction are identical to one another in the support stiffness against the inter-friction-roller radial pressing reaction, friction roller type transmission mechanisms that are capable of controlling the inter-friction-roller radial pressing force are subject to the following structural problem, although friction roller type transmission mechanisms in which the inter-friction-roller radial pressing force is set constant as in patent document 1.

In such a friction roller type transmission mechanism that is capable of controlling the inter-friction-roller radial pressing force, it is possible that one of the friction rollers is rotatably supported with respect to an eccentric shaft portion of a crankshaft whose rotational position is adapted to be controlled to adjust a radial pressing force between the friction rollers. In such a case, a friction roller shaft is drivingly engaged with the one of the friction rollers, arranged coaxially with a corresponding axial end of the crankshaft to face the axial end, and bearing-fitted to the axial end.

The following construction allows the bearing supports to bear a radial pressing reaction between the friction rollers. A first bearing support is disposed in a plane perpendicular to an axial direction, which plane contains a portion of the bearing-fitting, wherein the friction roller shaft related to the one of the friction rollers, and a friction roller shaft related to another of the friction rollers are bearing-fitted to the first bearing support. A second bearing support is disposed in a plane opposite to the first bearing support with respect to the friction rollers, wherein the crankshaft related to the one of the friction rollers, and the friction roller shaft related to the other of the friction rollers are bearing-fitted to the second bearing support. This construction allows the first and second bearing supports to bear the inter-friction-roller radial pressing reaction, and thereby serves to avoid a disadvantage that the inter-friction-roller radial pressing is inputted to the housing.

In the above construction, a bearing-fitting portion where the crankshaft and the friction roller shaft related to the one of the friction rollers are arranged coaxially with one another to face one another is disposed radially inside a bearing-fitting portion between the first bearing support and the friction roller shaft related to the one of the friction rollers. Accordingly, the inter-friction-roller radial pressing reaction from the one of the friction rollers to the crankshaft is transmitted to the first bearing support through the bearing-fitting portion where the crankshaft and the friction roller shaft related to the one of the friction rollers are arranged coaxially with one another to face one another, and through the bearing-fitting portion between the first bearing support and the friction roller shaft related to the one of the friction rollers, i.e. through inner and outer bearings in double layer arrangement.

Each bearing is an assembled product of a lot of parts such as an inner race, an outer race, and a lot of rolling elements between the inner race and outer race. Accordingly, each bearing is lower in support stiffness against the inter-friction-roller radial pressing reaction (smaller in spring constant) than the bearing supports which are usually formed integrally. As a result, the bearing-fitting portion where the crankshaft and the friction roller shaft related to the one of the friction rollers are arranged coaxially with one another to face one another, which transmits the inter-friction-roller radial pressing reaction to the first bearing support through the place where inner and outer bearings that are lower in the support stiffness against the inter-friction-roller radial pressing reaction (smaller in spring constant) are disposed in double layer arrangement, is displaced in the corresponding radial direction by a relatively large amount, due to a large amount of deformation of inner and outer bearings in double layer arrangement under the inter-friction-roller radial pressing reaction, in addition to a small amount of deformation of the bearing support.

In contrast, each of the other bearing-fitting portions at the first bearing support and second bearing support is provided with a bearing in single arrangement. Each shaft portion which transmits the inter-friction-roller radial pressing reaction to the corresponding bearing support through the bearing in single arrangement, is not displaced in the radial direction by a large amount, even when a small amount of deformation of the bearing in single arrangement due to the inter-friction-roller radial pressing reaction is added to a small amount of deformation of the bearing support. As a result, the relatively large radial displacement of the bearing-fitting portion where the crankshaft and the friction roller shaft related to the one of the friction rollers are arranged coaxially with one another to face one another, causes unbalanced contact between frictional contact portions of the friction rollers, and thereby shortens the life of the friction rollers, and lowers the transmission efficiency, which is undesirable anyway.

It is an object of the present invention to provide a friction roller type transmission mechanism which is capable of solving the problem described above about decrease in the life of the friction rollers and decrease in the transmission efficiency, wherein the large radial displacement of the bearing-fitting portion where the crankshaft and the friction roller shaft related to the one of the friction rollers are arranged coaxially with one another to face one another, due to the large amount of deformation of the inner and outer bearings in double layer arrangement, is reduced by a measure for the bearing support, so as to prevent unbalanced contact between the friction rollers.

For the object, a friction roller type transmission mechanism according to the present invention is based on a friction roller type transmission mechanism in which a pair of friction rollers that rotate about respective axes parallel to one another are pressed against one another in a radial direction of the friction rollers into frictional contact with one another in one of a direct manner and an indirect manner, to allow power transmission between the friction rollers.

Additionally, one of the friction rollers is rotatably supported with respect to an eccentric shaft portion of a crankshaft whose rotational position is adapted to be controlled to adjust a radial pressing force between the friction rollers. A friction roller shaft is drivingly engaged with the one of the friction rollers, arranged coaxially with a corresponding axial end of the crankshaft to face the axial end, and bearing-fitted to the axial end.

Moreover, a first bearing support is disposed in a plane perpendicular to an axial direction, which plane contains a portion of the bearing-fitting, wherein the friction roller shaft related to the one of the friction rollers, and a friction roller shaft related to another of the friction rollers are bearing-fitted to the first bearing support, and a second bearing support is disposed in a plane opposite to the first bearing support with respect to the friction rollers, wherein the crankshaft related to the one of the friction rollers, and the friction roller shaft related to the other of the friction rollers are bearing-fitted to the second bearing support, so that the first and second bearing supports bear a radial pressing reaction between the friction rollers.

The friction roller type transmission mechanism according to the present invention is characterized in that support stiffness of the first bearing support against the radial pressing reaction between the friction rollers is higher than that of the second bearing support.

DETAILED DESCRIPTION

According to the friction roller type transmission mechanism according to the present invention, the construction that support stiffness of the first bearing support against the radial pressing reaction between the friction rollers is higher than that of the second bearing support, serves to solve the problem described above about decrease in the life of the friction rollers and decrease in the transmission efficiency by preventing unbalanced contact between the friction rollers, wherein even when the bearing-fitting portion where the crankshaft and the friction roller shaft related to the one of the friction rollers are arranged coaxially with one another to face one another is displaced in the corresponding radial direction by a relatively large amount, due to a large amount of deformation of the inner and outer bearings in double layer arrangement under the inter-friction-roller radial pressing reaction, in addition to deformation of the first bearing support, the large radial displacement of the bearing-fitting portion where the crankshaft and the friction roller shaft related to the one of the friction rollers are arranged coaxially with one another to face one another is canceled by the difference in the support stiffness against the inter-friction-roller radial pressing reaction between the first bearing support and second bearing support.

Figure 1:
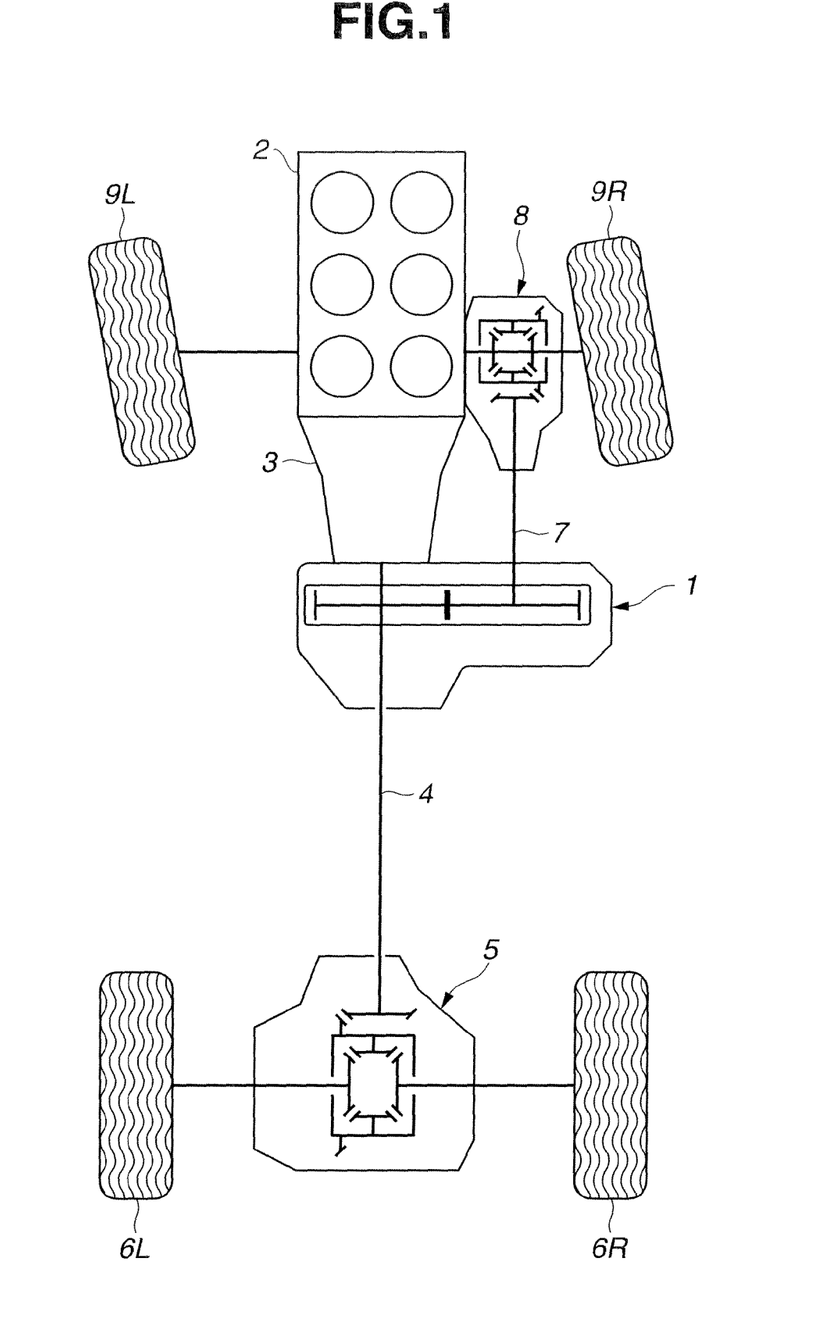
FIG. 1 is a schematic plan view from above a four wheel drive vehicle, showing a powertrain of the four wheel drive vehicle which is provided with a friction roller type transmission mechanism according to an embodiment of the present invention as a driving force distribution device.

The following describes modes of carrying out the present invention, with reference to embodiments shown in the drawings. FIG. 1 is a schematic plan view from above a four wheel drive vehicle, showing a powertrain of the four wheel drive vehicle which is provided with a friction roller type transmission mechanism according to an embodiment of the present invention as a driving force distribution device 1.

The four wheel drive vehicle of FIG. 1 is based on a rear wheel drive vehicle in which rotation from an engine 2 is shifted by a transmission 3, and then transmitted through a rear propeller shaft 4 and a rear final drive unit 5 to left and right rear wheels 6L, 6R, and constructed so that a part of torque to left and right rear wheels (main driving wheels) 6L, 6R is transmitted by frictional transmission of driving force distribution device 1 through a front propeller shaft 7 and a front final drive unit 8 to left and right front wheels (auxiliary driving wheels) 9L, 9R, thus achieving four wheel driving.

Figure 2:
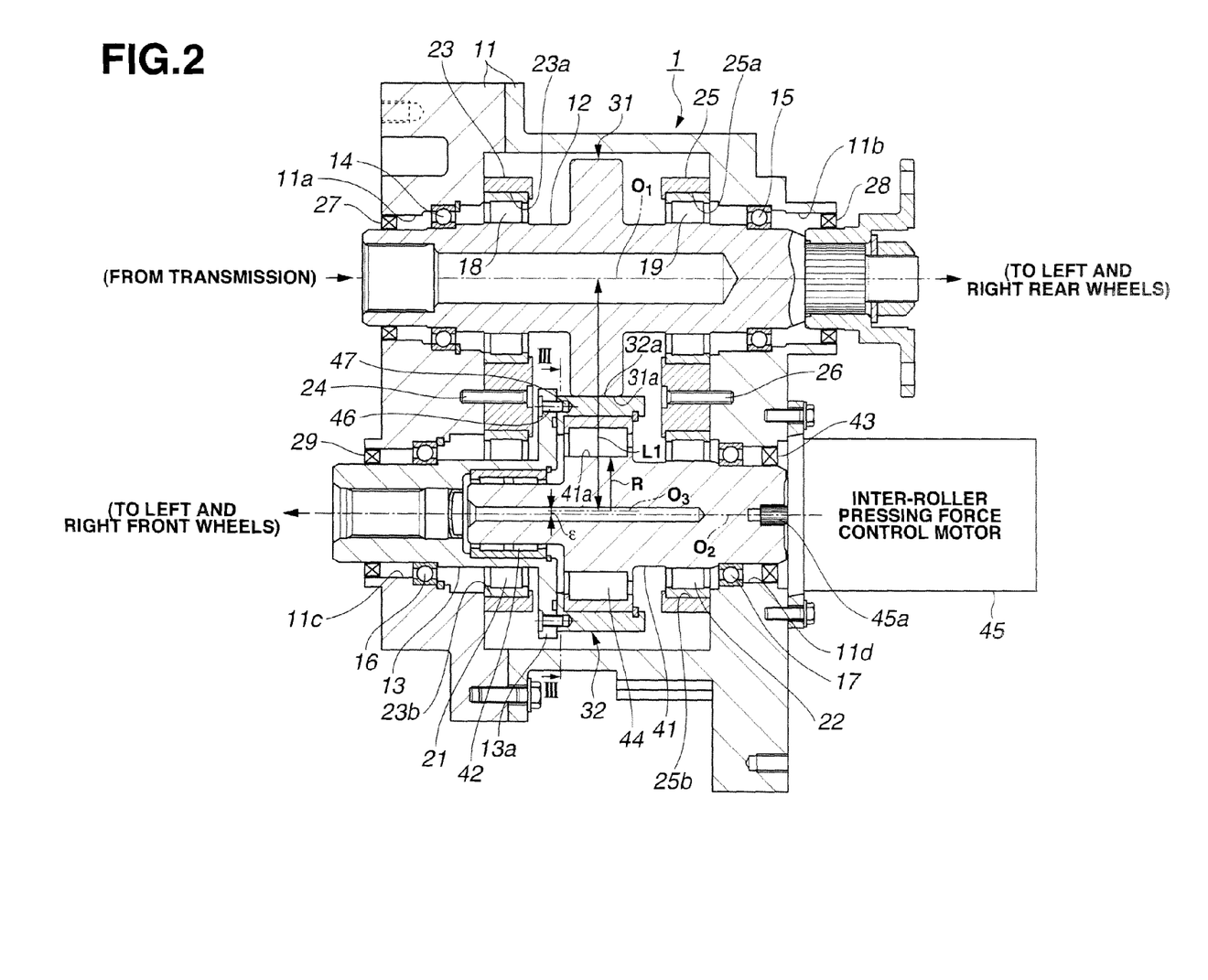
FIG. 2 is a side sectional view of the driving force distribution device (friction roller type transmission mechanism) of FIG. 1.

Driving force distribution device (friction roller type transmission mechanism) 1 is thus configured to set torque distribution between left and right rear wheels (main driving wheels) 6L, 6R, and left and right front wheels (auxiliary driving wheels) 9L, 9R by splitting and outputting to left and right front wheels (auxiliary driving wheels) 9L, 9R a part of torque to left and right rear wheels (main driving wheels) 6L, 6R, In this embodiment, driving force distribution device (friction roller type transmission mechanism) 1 is constructed as shown in FIG. 2.

In FIG. 2, a long input shaft 12 and a shaft unit are arranged to laterally cross in a housing 11, which are parallel to one another. The shaft unit includes a short output shaft 13, and a crankshaft 41 that is arranged coaxially with output shaft 13 to face the output shaft 13 in the axial direction, and rotatably bearing-fitted to output shaft 13 through a needle bearing 42. Input shaft 12 is rotatably supported with respect to housing 11 by ball bearings 14, 15 at both ends of input shaft 12 which are inserted in shaft through holes 11a, 11b of housing 11, wherein each of ball bearings 14, 15 is provided between a respective one of the ends of input shaft 12 and a respective one of shaft through holes 11a, 11b of housing 11.

The shaft unit, which is composed of output shaft 13 and crankshaft 41, is rotatably supported with respect to housing 11 by ball bearings 16, 17 at both ends of the shaft unit which are inserted in shaft through holes 11c, 11d of housing 11, wherein each of ball bearings 16, 17 is provided between a respective one of the ends of the shaft unit and a respective one of shaft through holes 11c, 11d of housing 11.

Of input shaft 12 and the shaft unit (output shaft 13 and crankshaft 41) which are rotatably supported and arranged to laterally cross in housing 11 as described above, the input shaft 12 is provided with roller bearings 18, 19 which are disposed in housing 11 and fitted over input shaft 12, and the shaft unit 13, 41 is provided with roller bearings 21, 22 which are disposed in housing 11 and fitted over the shaft unit. Roller bearings 18, 21, and needle bearing 42, which is disposed between output shaft 13 and the bearing-fitted portion of crankshaft 41 that is coaxially arranged to face the output shaft 13 in the axial direction, are positioned substantially within a common plane perpendicular to the axial direction. Roller bearings 19, 22 are positioned within a common plane perpendicular to the axial direction, which plane is distant from roller bearings 18, 21 in the axial direction.

Roller bearings 18, 21 for input shaft 12 and output shaft 13, which are positioned substantially within a common plane together with needle bearing 42, are held in bearing-fitting portions 23a, 23b of a first bearing support 23 commonly. Bearing support 23 is attached to a corresponding inside surface of housing 11 by an arbitrary means such as a bolt 24 at a central portion of bearing support 23. On the other hand, roller bearings 19, 22 for input shaft 12 and crankshaft 41, which are positioned within the second plane perpendicular to the axial direction, are held in bearing-fitting portions 25a, 25b of a second bearing support 25 commonly. Bearing support 25 is attached to a corresponding inside surface of housing 11 by an arbitrary means such as a bolt 26 at a central portion of bearing support 25.

Both ends of input shaft 12 are made to extend out of housing 11, sealed liquid-tightly by seal rings 27, 28 each of which is provided between a respective one of the ends of input shaft 12 and a respective one of shaft through holes 11a, 11b of housing 11. The left end (in FIG. 2) of input shaft 12 is coupled to an output shaft of transmission 3 (see FIG. 1), and the right end (in FIG. 2) of input shaft 12 is coupled through rear propeller shaft 4 (see FIG. 1) to rear final drive unit 5. The left end (in FIG. 2) of output shaft 13 is made to extend out of housing 11, sealed liquid-tightly by a seal ring 29 that is provided between output shaft 13 and shaft through hole 11c of housing 11. The left end of output shaft 13 is coupled through front propeller shaft 7 (see FIG. 1) to front final drive unit 8.

Input shaft 12 is formed integrally with a first friction roller 31 substantially at the center of input shaft 12 in the axial direction of input shaft 12, wherein first friction roller 31 is coaxially arranged with input shaft 12. Accordingly, input shaft 12 serves as a shaft of first friction roller 31 (friction roller shaft). Crankshaft 41 includes an eccentric shaft portion 41a between bearing portions 17, 42 at both ends, where the eccentric shaft portion 41a has a semidiameter R. Eccentric shaft portion 41a has a central axis $O_3$ that is arranged with an offset of $\epsilon$ from a rotation axis $O_2$ of crankshaft 41 (output shaft 13), and is positioned in a common plane perpendicular to the axial direction together with first friction roller 31 on input shaft 12. Second friction roller 32 is rotatably attached through a roller bearing 44 to the eccentric shaft portion 41a of crankshaft 41, although the position of second friction roller 32 in the axial direction is determined. The shaft unit, which is composed of crankshaft 41 and output shaft 13, serves as a shaft of second friction roller 32 (friction roller shaft).

Accordingly, the rotation axis of second friction roller 32 is identical to the central axis $O_3$ of eccentric shaft portion 41a. By adjusting an inter-axis distance L1 between first friction roller 31 and second friction roller 32 (distance between the rotation axis $O_1$ of first friction roller 31 and rotation axis $O_3$ of second friction roller 32) by making the second friction roller rotation axis $O_3$ (the central axis of eccentric shaft portion 41a) revolve around the crankshaft rotation axis (output shaft rotation axis) $O_2$ by control of the rotational position of crankshaft 41, the radial pressing force between first friction roller 31 and second friction roller 32 (transmitted torque capacity between the first and second friction rollers) can be arbitrarily controlled.

In order to achieve an inter-friction-roller transmitted torque capacity control, the right end (in FIG. 2) of crankshaft 41 father from output shaft 13 is exposed out of housing 11, and sealed liquid-tightly by a seal ring 43 that is provided between the right end of crankshaft 41 and shaft through hole 11d of housing 11. The exposed end surface of crankshaft 41 is drivingly coupled, for example, by serration coupling, to an output shaft 45a of an inter-roller pressing force control motor 45 that is attached to housing 11.

When second friction roller 32 is pressed to first friction roller 31 in the radial direction under control of motor 45 so as to bring the outside surfaces of rollers 31, 32 into frictional contact with one another at places indicated by symbols 31a, 32a, torque can be transmitted from first friction roller 31 to second friction roller 32 through the frictional contact portions 31a, 32a. In order to allow rotation of the rotated second friction roller 32 to be transmitted to output shaft 13, output shaft 13 is formed integrally with a flange portion 13a at the inside end, and the diameter of the flange portion 13a is set so that the flange portion 13a faces the second friction roller 32 in the axial direction.

Figure 3:
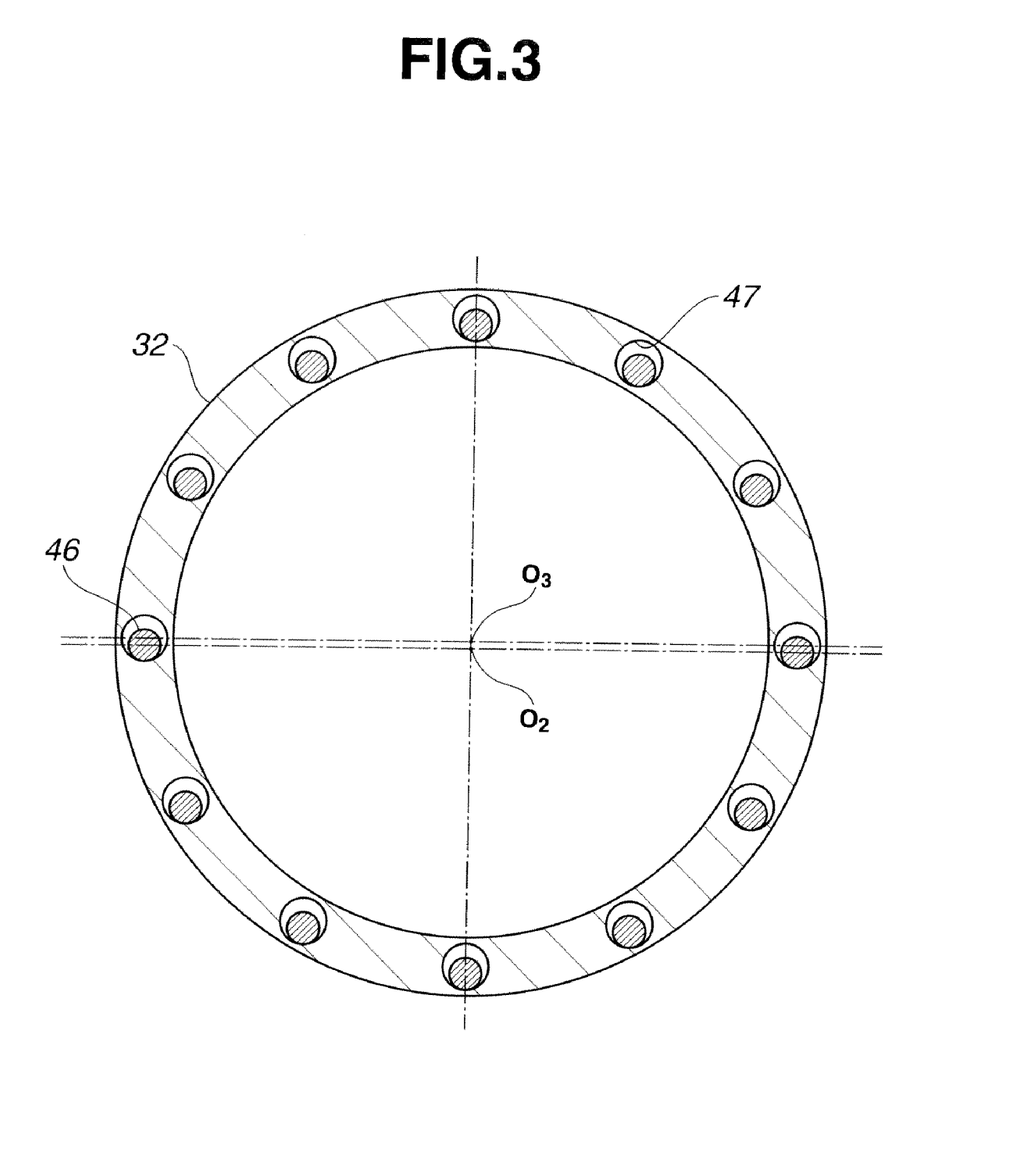
FIG. 3 is a sectional view taken along the line and viewed in the direction of an arrow in FIG. 2, showing a driving force transmitting section from a second friction roller to an output shaft.

A plurality of driving pins 46 are fixed to the output shaft flange portion 13a that faces the second friction roller 32, where driving pins 46 project toward second friction roller 32. Driving pins 46 are arranged along a common circle at even intervals as shown in FIG. 3. The end surface of second friction roller 32 facing the output shaft flange portion 13a is formed with a plurality of holes 47 through which driving pins 46 are inserted respectively, in order to allow torque transmission from second friction roller 32 to output shaft 13 (flange portion 13a). Driving pin insertion hole 47 has the form of a circular hole having a larger diameter than the diameter of driving pin 46, as clearly shown in FIG. 3. The diameter of driving pin insertion hole 47 is set large enough to allow torque transmission from second friction roller 32 to output shaft 13 (flange portion 13a), while absorbing the eccentricity $\epsilon$ between the rotation axis $O_2$ of output shaft 13 and the rotation axis $O_3$ of second friction roller 32.

The following describes operations of the embodiment shown in FIGS. 1 to 3. The output torque of transmission 3 is inputted to the left end (in FIG. 2) of input shaft 12. On one hand, the torque is transmitted directly from input shaft 12 through rear propeller shaft 4 and rear final drive unit 5 to left and right rear wheels 6L, 6R (main driving wheels). On the other hand, driving force distribution device (friction roller type transmission mechanism) 1 directs to output shaft 13 a part of torque to left and right rear wheels 6L, 6R, through first friction roller 31, frictional contact portions 31a, 32a between first friction roller 31 and second friction roller 32, second friction roller 32, driving pins 46, and output shaft flange portion 13a, and then transmits this torque to left and right front wheels (auxiliary driving wheels) 9L, 9R from the left end (in FIG. 2) of output shaft 13 through front propeller shaft 7 and front final drive unit 8. This allows four wheel driving of the vehicle wherein all of left and right rear wheels (main driving wheels) 6L, 6R and left and right front wheels (auxiliary driving wheels) 9L, 9R are driven.

When driving force distribution device (friction roller type transmission mechanism) 1 determines driving force distribution between left and right rear wheels (main driving wheels) 6L, 6R and left and right front wheels (auxiliary driving wheels) 9L, 9R by splitting and outputting to left and right front wheels (auxiliary driving wheels) 9L, 9R a part of torque to left and right rear wheels (main driving wheels) 6L, 6R as described above, the driving force distribution device 1 prevents the first friction roller 31 from transmitting to the second friction roller 32 a torque that is above the range of the transmitted torque capacity according to the radial pressing force between first friction roller 31 and second friction roller 32 (inter-friction-roller radial pressing force).

Accordingly, the upper limit of the torque to the left and right front wheels (auxiliary driving wheels) is set to a value corresponding to the radial pressing force between first friction roller 31 and second friction roller 32, so that the driving force distribution between left and right rear wheels (main driving wheels) 6L, 6R and left and right front wheels (auxiliary driving wheels) 9L, 9R has characteristics such that the torque to the left and right front wheels (auxiliary driving wheels) is held at the upper limit when the input torque is above a certain value.

Accordingly, even if the input torque to driving force distribution device 1 becomes large, the torque to the left and right front wheels (auxiliary driving wheels) does not exceed the upper limit described above. Therefore, driving force distribution device 1 can be used as a driving force distribution device for a four wheel drive vehicle in which the driving system of the left and right front wheels (auxiliary driving wheels) must be compact to satisfy the demand of compactness of the vehicle, wherein it is unnecessary to care about whether the strength of the driving system of the left and right front wheels (auxiliary driving wheels) is insufficient.

Moreover, in this embodiment, it is possible to adjust the inter-axis distance L1 between first friction roller 31 and second friction roller 32 by controlling the rotational position of crankshaft 41 about the axis $O_2$ by means of inter-roller pressing force control motor 45 so that the second friction roller rotation axis $O_3$ (the central axis of eccentric shaft portion 41a) revolves around the crankshaft rotation axis (output shaft rotation axis) $O_2$.

The control of changing the inter-axis distance L1 between first friction roller 31 and second friction roller 32 allows control of changing the radial pressing force of second friction roller 32 to first friction roller 31, and thereby makes it possible to arbitrarily control the transmitted torque capacity between the first and second friction rollers. Accordingly, the upper limit of the torque to the left and right front wheels (auxiliary driving wheels) can be arbitrarily changed by controlling the rotational position of crankshaft 41 with motor 45, so as to set suitable driving force distribution between left and right rear wheels 6L, 6R (main driving wheels) and left and right front wheels 9L, 9R (auxiliary driving wheels).

In the shown example, the friction roller shaft (output shaft) 13 related to second friction roller 32, and the friction roller shaft (input shaft) 12 related to first friction roller 31 are fitted to first bearing support 23 through bearings 21, 18, respectively, wherein first bearing support 23 is placed in the plane perpendicular to the axial direction, which plane contains the bearing fitting portion (needle bearing 42) where output shaft 13 drivingly coupled to second friction roller 32 and the corresponding axial end of crankshaft 41 are coaxially arranged to face one another. On the other hand, crankshaft 41 related to second friction roller 32 and the friction roller shaft (input shaft) 12 related to first friction roller 31 are fitted to second bearing support 25 through bearings 22, 19, respectively, wherein second bearing support 25 is placed in the plane perpendicular to the axial direction, which plane is opposed to first bearing support 23 with respect to second friction roller 32. Accordingly, first and second bearing supports 23, 25 bear an inter-friction-roller radial pressing reaction which is caused when second friction roller 32 is pressed to first friction roller 31 in the radial direction into frictional contact with one another. This serves to cancel the inter-friction-roller radial pressing reaction within bearing supports 23, 25, and prevent the inter-friction-roller radial pressing reaction from being inputted directly to housing 11, thereby making it possible to reduce the weight of housing 11 because the strength of housing 11 does not need to be high.

The following discusses a path in which the inter-friction-roller radial pressing reaction is transmitted from second friction roller 32 to bearing support 23. The inter-friction-roller radial pressing reaction from second friction roller 32 is transmitted to first bearing support 23 through roller bearing 44 and crankshaft 41, through needle bearing 42 at the fitting portion where crankshaft 41 and the friction roller shaft (output shaft) 13 related to second friction roller 32 are arranged coaxially with one another to face one another, and through roller bearing 21 at the fitting portion between first bearing support 23 and the friction roller shaft (output shaft) 13 related to second friction roller 32, i.e. through inner and outer bearings 42, 21 in double layer arrangement.

Each bearing is an assembled product of a lot of parts such as an inner race, an outer race, and a lot of rolling elements between the inner race and outer race. Accordingly, each bearing is lower in support stiffness against the inter-friction-roller radial pressing reaction (smaller in spring constant) than the bearing supports which are usually formed integrally. As a result, the bearing-fitting portion where crankshaft 41 and the friction roller shaft (output shaft) 13 related to second friction roller 32 are arranged coaxially with one another to face one another, which transmits the inter-friction-roller radial pressing reaction to first bearing support 23 through the bearing-fitting portion where inner and outer bearings 42, 21 that are lower in the support stiffness against the inter-friction-roller radial pressing reaction (smaller in spring constant) are disposed in double layer arrangement, is displaced in the corresponding radial direction by a relatively large amount, due to a large amount of total deformation of inner and outer bearings 42, 21 in double layer arrangement under the inter-friction-roller radial pressing reaction, in addition to deformation of first bearing support 23.

In contrast, each of the other bearing-fitting portions at first bearing support 23 and second bearing support 25 is provided with bearing 18, 19, 22 in single arrangement. Each shaft portion which transmits the inter-friction-roller radial pressing reaction to the corresponding bearing support 23, 25 through the bearing in single arrangement, is not displaced in the radial direction by a large amount, even when a small amount of deformation of the bearing in single arrangement due to the inter-friction-roller radial pressing reaction is added to deformation of the corresponding bearing support 23, 25. As a result, the relatively large radial displacement of the bearing-fitting portion where crankshaft 41 and the friction roller shaft (output shaft) 13 related to second friction roller 32 are arranged coaxially with one another to face one another, causes unbalanced contact between frictional contact portions 31a, 32a of friction rollers 31, 32, and thereby shortens the life of friction rollers 31, 32, and lowers the transmission efficiency.

Figure 4:
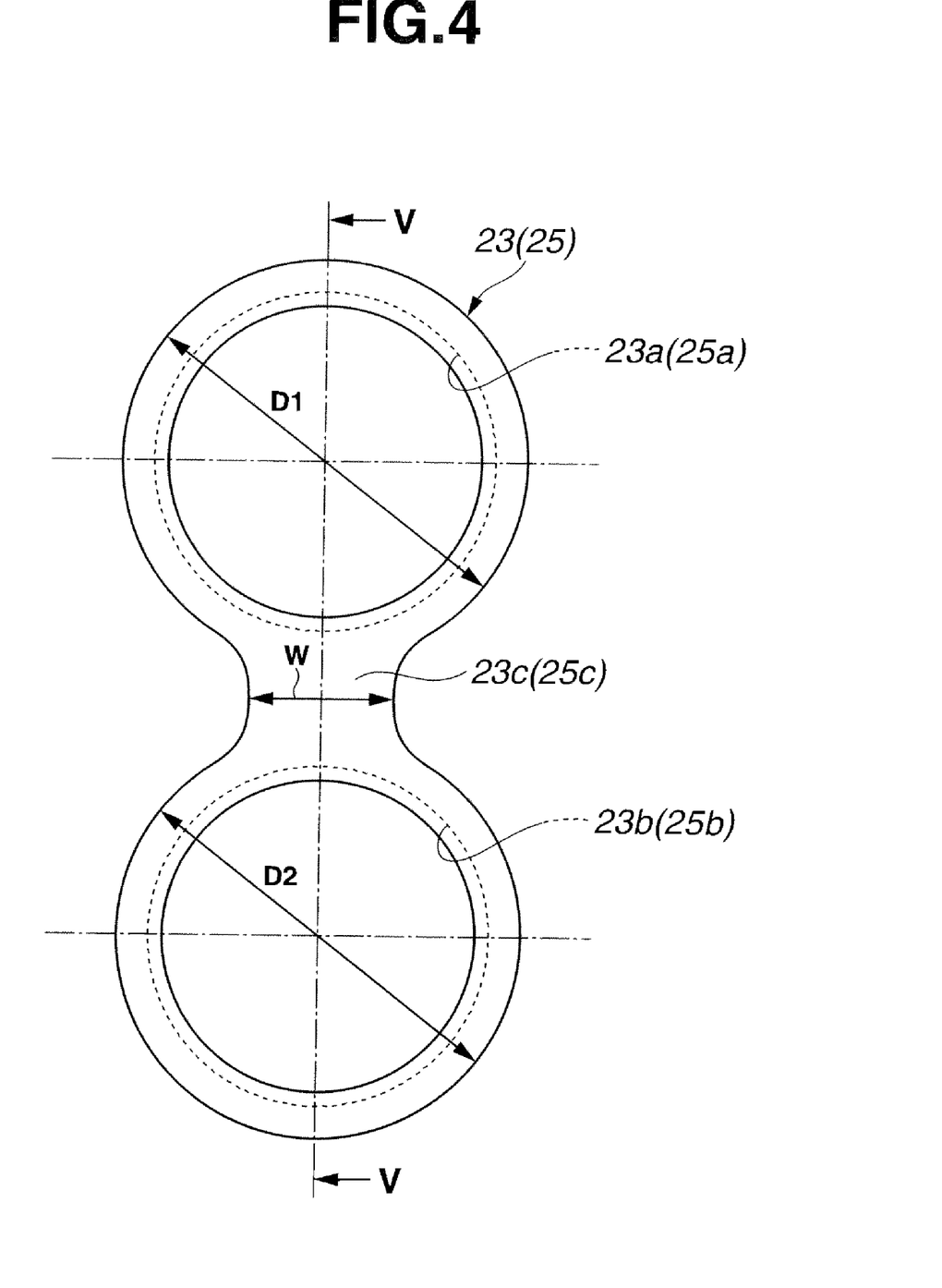
FIG. 4 is a front view of a bearing support of the driving force distribution device (friction roller type transmission mechanism) shown in FIG. 2.
Figure 5:
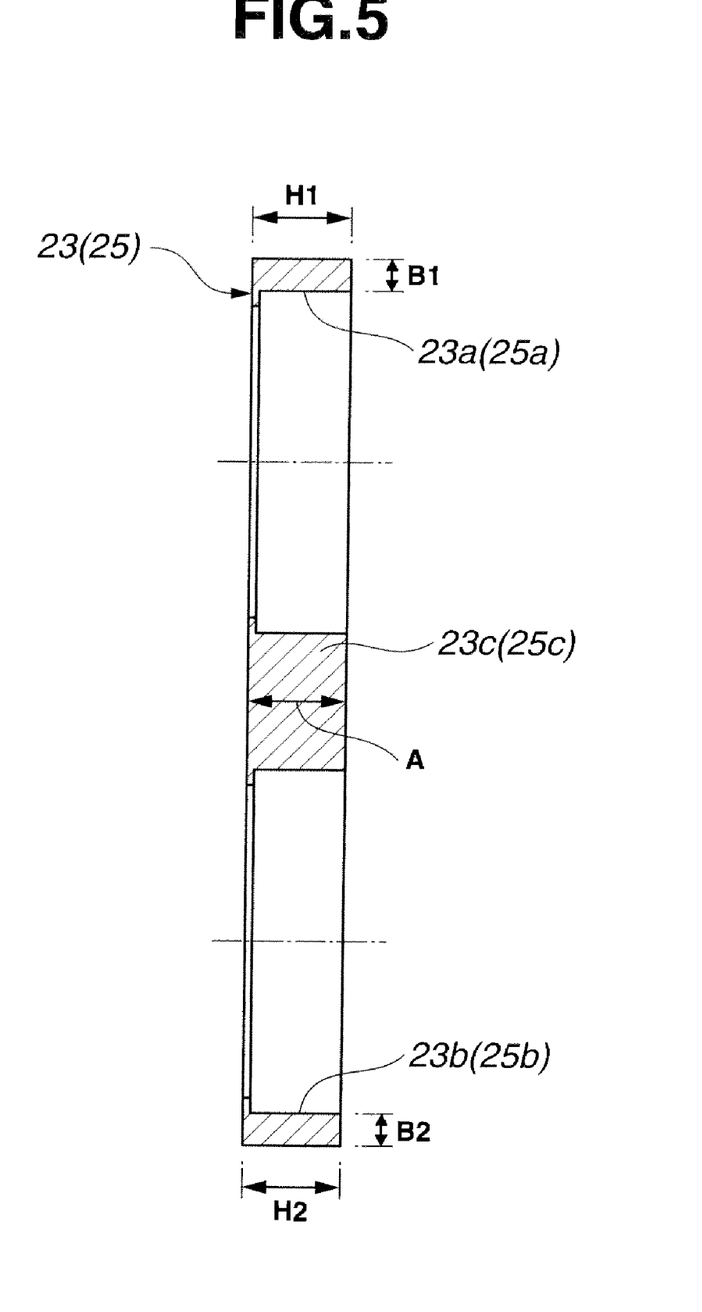
FIG. 5 is a side sectional view of the bearing support, taken along the line V-V and viewed in the direction of an arrow in FIG. 4.

In the embodiment shown in FIGS. 1 to 3, in order to solve the problem described above, the sizes of first bearing support 23 and second bearing support 25 shown in FIGS. 4 and 5, are determined so that the support stiffness of first bearing support 23 against the inter-friction-roller radial pressing reaction is higher than that of second bearing support 25, as follows. The cross-sectional area (product of width W and thickness A) of a center section 23c of first bearing support 23 between a bearing-fitting portion 23b of first bearing support 23 for the friction roller shaft (output shaft) 13 related to second friction roller 32, and a bearing-fitting portion 23a of first bearing support 23 for the friction roller shaft (input shaft) 12 related to first friction roller 31, is set larger than the cross-sectional area (product of width W and thickness A) of a center section 25c of second bearing support 25 between a bearing-fitting portion 25b of second bearing support 25 for crankshaft 41 related to second friction roller 32, and a bearing-fitting portion 25a of second bearing support 25 for the friction roller shaft (input shaft) 12 related to first friction roller 31. This provides a difference in the support stiffness against the inter-friction-roller radial pressing reaction between bearing supports 23, 25, wherein the support stiffness of first bearing support 23 against the inter-friction-roller radial pressing reaction is set higher than that of second bearing support 25.

Figure 6:
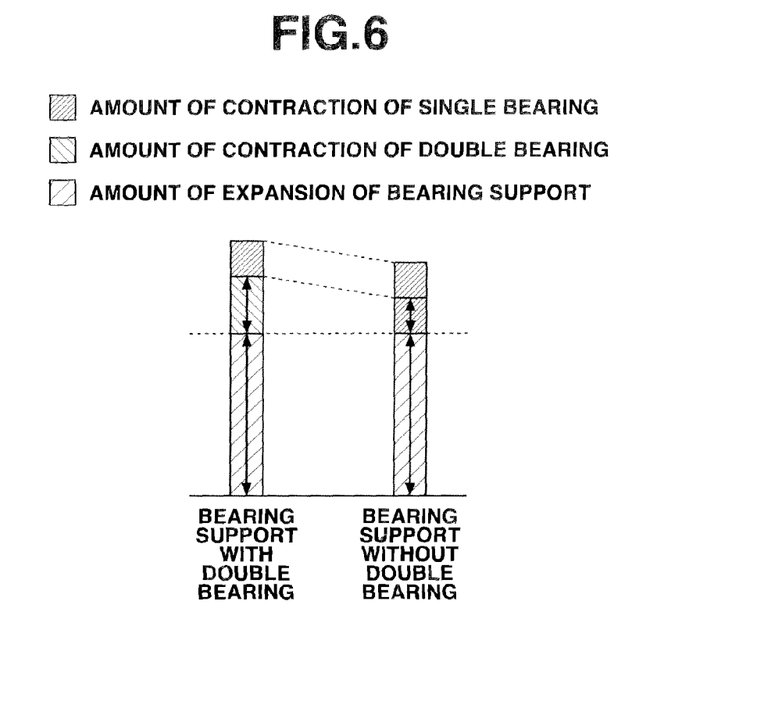
FIG. 6 is a diagram schematically showing an amount of expansion of an inter-axis distance of each bearing support in a friction roller type transmission mechanism according to a reference example.
Figure 7:
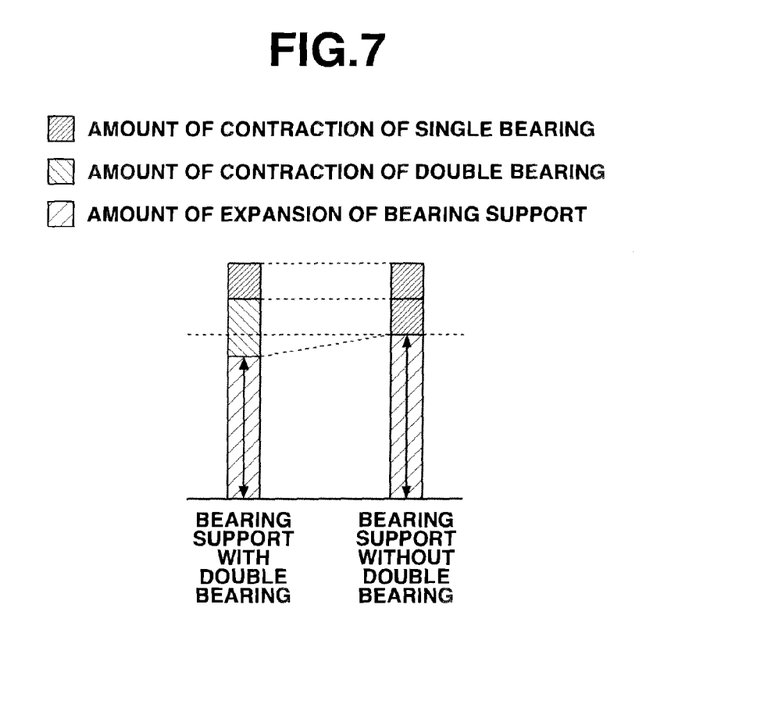
FIG. 7 is a diagram schematically showing an amount of expansion of an inter-axis distance of each bearing support in the friction roller type transmission mechanism according to the embodiment.

FIG. 6 schematically shows an amount of expansion of an inter-axis distance of each bearing support in a friction roller type transmission mechanism according to a reference example. FIG. 7 schematically shows an amount of expansion of an inter-axis distance of each bearing support in the friction roller type transmission mechanism according to the embodiment. Under application of the pressing force between the friction rollers, the bearing support expands and bearings contract, so that the inter-roller-axis distance expands. Since the double bearing (double layer bearing) is lower in support stiffness than the single bearing (single layer bearing), the double bearing differs in the amount of contraction from the single bearing, so that the amount of contraction of the double bearing is larger than that of the single bearing. In the reference example where the support stiffness of bearing support 23 is set equal to that of bearing support 25, the amount of expansion of the inter-axis distance of bearing support 23 provided with one single bearing and one double bearing is larger than that of bearing support 25 provided with two single bearings, i.e. the amount of expansion of the inter-axis distance is different between the bearing supports. In contrast, in the present embodiment where a difference in the support stiffness is provided between the is bearing supports so that the support stiffness of bearing support 23 provided with one single bearing and one double bearing is set higher than that of bearing support 25 provided with two single bearings, the amount of expansion the inter-axis distance of bearing support 23 is smaller than in the reference example shown in FIG. 6, as shown in FIG. 7. This serves to reduce the amount of expansion of the inter-axis distance of bearing support 23 provided with the double bearing, and thereby prevent deviation in the amount of expansion of the inter-axis distance between the bearing supports.

In this way, the construction that the support stiffness of bearing support 23 against the inter-friction-roller radial pressing reaction is set higher than that of bearing support 25, serves to solve the problem about decrease in the life of friction rollers 31, 32 and decrease in the transmission efficiency by preventing unbalanced contact between friction rollers 31, 32, wherein even when the bearing-fitting portion where crankshaft 41 and the friction roller shaft (output shaft) 13 related to second friction roller 32 are arranged coaxially with one another to face one another is displaced in the corresponding radial direction by a relatively large amount, due to a large amount of deformation of inner and outer bearings 42, 21 in double layer arrangement under the inter-friction-roller radial pressing reaction, in addition to deformation of first bearing support 23, the displacement is canceled by the small amount of deformation of first bearing support 23.

The feature that the support stiffness of first bearing support 23 against the inter-friction-roller radial pressing reaction is higher than that of second bearing support 25 may be implemented differently by the following construction. Specifically, the outside diameter D2 (see FIG. 4) of the bearing-fitting portion 23b of first bearing support 23 for the friction roller shaft (output shaft) 13 related to second friction roller 32 may be set larger than the outside diameter D2 (see FIG. 4) of the bearing-fitting portion 25b of second bearing support 25 for crankshaft 41 related to second friction roller 32, so that the support stiffness of first bearing support 23 against the inter-friction-roller radial pressing reaction is higher than that of second bearing support 25, thus achieving operations and effects as described above.

In FIGS. 1 to 3, each bearing support 23, 25 is attached to the inside surface of housing 11 by bolt 24, 26 at the center section 23c, 25c. However, the attachment is inessential, so that bearing support 23, 25 may be formed with no insertion hole for bolt 24, 26 at the center section 23c, 25c, as shown in FIGS. 4 and 5. In such a case where bearing support 23, 25 is not attached to the inside surface of housing 11, the feature that the support stiffness of first bearing support 23 against the inter-friction-roller radial pressing reaction is higher than that of second bearing support 25, may be implemented by a construction that the outside diameter D1 (see FIG. 4) of the bearing-fitting portion 23a of bearing support 23 for the friction roller shaft (input shaft) 12 related to first friction roller 31 is set larger than the outside diameter D1 (see FIG. 4) of the bearing-fitting portion 25a of bearing support 25 for the friction roller shaft (input shaft) 12 related to first friction roller 31, thus achieving operations and effects as described above.

Moreover, the feature that the support stiffness of first bearing support 23 against the inter-friction-roller radial pressing reaction is higher than that of second bearing support 25, may be implemented by a construction that the wall thickness B2 (see FIG. 5) of the bearing-fitting portion 23b of bearing support 23 for the friction roller shaft (output shaft) 13 related to second friction roller 32 is set larger than the wall thickness B2 (see FIG. 5) of the bearing-fitting portion 25b of bearing support 25 for crankshaft 41 related to second friction roller 32, thus achieving operations and effects as described above.

In such a case where bearing support 23, 25 is formed with no insertion hole for bolt 24, 26 at the center section 23c, 25c, as shown in FIGS. 4 and 5, and bearing support 23, 25 is not attached to the inside surface of housing 11, the feature that the support stiffness of first bearing support 23 against the inter-friction-roller radial pressing reaction is higher than that of second bearing support 25, may be implemented by a construction that the wall thickness B1 (see FIG. 5) of the bearing-fitting portion 23a of bearing support 23 for the friction roller shaft (input shaft) 12 related to first friction roller 31 is set larger than the wall thickness B1 (see FIG. 5) of the bearing-fitting portion 25a of bearing support 25 for the friction roller shaft (input shaft) 12 related to first friction roller 31, thus achieving operations and effects as described above.

Moreover, the feature that the support stiffness of first bearing support 23 against the inter-friction-roller radial pressing reaction is higher than that of second bearing support 25, may be implemented by a construction that the axial thickness H2 (see FIG. 5) of the bearing-fitting portion 23b of bearing support 23 for the friction roller shaft (output shaft) 13 related to second friction roller 32 is set larger than the axial thickness H2 (see FIG. 5) of the bearing-fitting portion 25b of bearing support 25 for crankshaft 41 related to second friction roller 32, thus achieving operations and effects as described above.

In such a case where bearing support 23, 25 is formed with no insertion hole for bolt 24, 26 at the center section 23c, 25c, as shown in FIGS. 4 and 5, and bearing support 23, 25 is not attached to the inside surface of housing 11, the feature that the support stiffness of first bearing support 23 against the inter-friction-roller radial pressing reaction is higher than that of second bearing support 25, may be implemented by a construction that the axial thickness H1 (see FIG. 5) of the bearing-fitting portion 23a of bearing support 23 for the friction roller shaft (input shaft) 12 related to first friction roller 31 is set larger than the axial thickness H1 (see FIG. 5) of the bearing-fitting portion 25a of bearing support 25 for the friction roller shaft (input shaft) 12 related to first friction roller 31, thus achieving operations and effects as described above.

Naturally, the feature that the support stiffness of first bearing support 23 against the inter-friction-roller radial pressing reaction is higher than that of second bearing support 25, may be implemented by an arbitrary combination of the measures described above.

In any case, in view of the purpose described above, it is naturally most desirable that the difference in support stiffness between first bearing support 23 and second bearing support 25 is such that an overall spring constant that is defined by a spring constant of first bearing support 23, a spring constant of the bearing-fitting portion (needle bearing 42) between crankshaft 41 and the friction roller shaft (output shaft) 13 related to second friction roller 32, and spring constants of bearing-fitting portions (roller bearings 18, 21) at two places of first bearing support 23, is equal to an overall spring constant that is defined by a spring constant of second bearing support 25, and spring constants of bearing-fitting portions (roller bearings 19, 22) at two places of second bearing support 25. In such a case, it is possible to completely prevent unbalanced contact between frictional contact portions 31a, 32a of first and second friction rollers 31, 32, and thereby completely achieve operations and effects as described above.

In any one of the embodiments described above, the feature that the support stiffness of first bearing support 23 against the inter-friction-roller radial pressing reaction is higher than that of second bearing support 25, is implemented by providing a difference in the size that influences the support stiffness against the inter-friction-roller radial pressing reaction between first bearing support 23 and second bearing support 25. However, instead or in addition, the feature that the support stiffness is differentiated between first bearing support 23 and second bearing support 25, may be implemented by a construction that first bearing support 23 is made of a material having a higher Young's modulus than second bearing support 25, thus achieving operations and effects as described above.

In the shown example, crankshaft 41 for control of inter-friction-roller radial pressing force is arranged coaxially with output shaft 13 to face output shaft 13, since the friction roller type transmission mechanism is used as driving force distribution device 1 of the four wheel drive vehicle. However, in cases where input shaft 12 does not need to be coupled to the driving system of the left and right rear wheels, crankshaft 41 for control of inter-friction-roller radial pressing force may be arranged coaxially with input shaft 12 to face input shaft 12. Such a friction roller type transmission mechanism may be applied with the concept of the present invention described above in a similar manner, thus achieving operations and effects as described above.

Moreover, the foregoing describes the cases where in the friction roller type transmission mechanism (driving force distribution device) 1, first and second friction rollers 31, 32 are adapted to be in direct frictional contact with one another at frictional contact portions 31a, 32a. Naturally, the concept of the present invention described above can be applied to friction roller type transmission mechanisms where first and second friction rollers 31, 32 are adapted to be in indirect frictional contact with one another through an idler roller. Naturally, such a case also produces similar operations and effects as described above.

The invention claimed is:

1. A friction roller type transmission mechanism, wherein:
a pair of friction rollers that rotate about respective axes parallel to one another are pressed against one another in a radial direction of the friction rollers into frictional contact with one another in one of a direct manner and an indirect manner, to allow power transmission between the friction rollers;
one of the friction rollers is rotatably supported with respect to an eccentric shaft portion of a crankshaft whose rotational position is adapted to be controlled to adjust a radial pressing force between the friction rollers;
a friction roller shaft is drivingly engaged with the one of the friction rollers, arranged coaxially with a corresponding axial end of the crankshaft to face the axial end, and bearing-fitted to the axial end;
a first bearing support is disposed in a plane perpendicular to an axial direction, which plane contains a portion of the bearing-fitting, wherein the friction roller shaft related to the one of the friction rollers, and a friction roller shaft related to another of the friction rollers are bearing-fitted to the first bearing support, and a second bearing support is disposed in a plane opposite to the first bearing support with respect to the friction rollers, wherein the crankshaft related to the one of the friction rollers, and the friction roller shaft related to the other of the friction rollers are bearing-fitted to the second bearing support, so that the first and second bearing supports bear a radial pressing reaction between the friction rollers; and
support stiffness of the first bearing support against the radial pressing reaction between the friction rollers is higher than that of the second bearing support.

2. The friction roller type transmission mechanism as claimed in claim 1, wherein difference in the support stiffness between the first bearing support and the second bearing support is such that an overall spring constant that is defined by a spring constant of the first bearing support, a spring constant of the portion of the bearing-fitting between the crankshaft and the friction roller shaft related to the one of the friction rollers, and spring constants of bearing-fitting portions at two places of the first bearing support, is equal to an overall spring constant that is defined by a spring constant of the second bearing support, and spring constants of bearing-fitting portions at two places of the second bearing support.

3. The friction roller type transmission mechanism as claimed in claim 1, wherein the difference in the support stiffness between the first bearing support and the second bearing support is implemented by a difference in a size related to the support stiffness between the first bearing support and the second bearing support.

4. The friction roller type transmission mechanism as claimed in claim 3, wherein the difference in the support stiffness between the first bearing support and the second bearing support is implemented by that a center section of the first bearing support between the bearing-fitting portion of the first bearing support for the friction roller shaft related to the one of the friction rollers and the bearing-fitting portion of the first bearing support for the friction roller shaft related to the other of the friction rollers has a larger cross-sectional area than a center section of the second bearing support between the bearing-fitting portion of the second bearing support for the crankshaft related to the one of the friction rollers and the bearing-fitting portion of the second bearing support for the friction roller shaft related to the other of the friction rollers.

5. The friction roller type transmission mechanism as claimed in claim 3, wherein the difference in the support stiffness between the first bearing support and the second bearing support is implemented by that at least one of the bearing-fitting portion of the first bearing support for the friction roller shaft related to the one of the friction rollers, and the bearing-fitting portion of the first bearing support for the friction roller shaft related to the other of the friction rollers has a larger outside diameter than at least one of the bearing-fitting portion of the second bearing support for the crankshaft related to the one of the friction rollers, and the bearing-fitting portion of the second bearing support for the friction roller shaft related to the other of the friction rollers.

6. The friction roller type transmission mechanism as claimed in claim 3, wherein the difference in the support stiffness between the first bearing support and the second bearing support is implemented by that at least one of the bearing-fitting portion of the first bearing support for the friction roller shaft related to the one of the friction rollers and the bearing-fitting portion of the first bearing support for the friction roller shaft related to the other of the friction rollers has a larger wall thickness than at least one of the bearing-fitting portion of the second bearing support for the crankshaft related to the one of the friction rollers and the bearing-fitting portion of the second bearing support for the friction roller shaft related to the other of the friction rollers.

7. The friction roller type transmission mechanism as claimed in claim 3, wherein the difference in the support stiffness between the first bearing support and the second bearing support is implemented by that at least one of the bearing-fitting portion of the first bearing support for the friction roller shaft related to the one of the friction rollers and the bearing-fitting portion of the first bearing support for the friction roller shaft related to the other of the friction rollers has a larger axial thickness than at least one of the bearing-fitting portion of the second bearing support for the crankshaft related to the one of the friction rollers and the bearing-fitting portion of the second bearing support for the friction roller shaft related to the other of the friction rollers.

8. The friction roller type transmission mechanism as claimed in claim 3, wherein the difference in the support stiffness between the first bearing support and the second bearing support is implemented by that the first bearing support is made of a material having a higher Young's modulus than the second bearing support.

\* \* \* \* \*